(12) United States Patent
Jung

(10) Patent No.: US 12,522,229 B2
(45) Date of Patent: Jan. 13, 2026

(54) APPARATUS AND METHOD FOR CONTROLLING VEHICLE DRIVING

(71) Applicant: HYUNDAI MOBIS CO., LTD., Seoul (KR)

(72) Inventor: Sung Dae Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 40 days.

(21) Appl. No.: 18/642,408

(22) Filed: Apr. 22, 2024

(65) Prior Publication Data
US 2025/0010869 A1   Jan. 9, 2025

(30) Foreign Application Priority Data
Jul. 3, 2023   (KR) .......................... 10-2023-0085633

(51) Int. Cl.
*B60W 30/16* (2020.01)
*B60W 30/18* (2012.01)
*B60W 50/06* (2006.01)

(52) U.S. Cl.
CPC ...... *B60W 50/06* (2013.01); *B60W 30/18163* (2013.01); *B60W 30/16* (2013.01); *B60W 2420/403* (2013.01); *B60W 2554/404* (2020.02); *B60W 2554/802* (2020.02)

(58) Field of Classification Search
CPC .............................. B60W 30/16; B60W 50/06
See application file for complete search history.

(56) References Cited

U.S. PATENT DOCUMENTS

| | | | |
|---|---|---|---|
| 2023/0112601 A1* | 4/2023 | Nanri | B60W 30/12 701/1 |
| 2023/0294682 A1* | 9/2023 | Kim | G06V 20/58 |
| 2024/0157947 A1* | 5/2024 | Ueda | B60W 50/0098 |
| 2024/0199053 A1* | 6/2024 | Tsujino | B60K 35/23 |
| 2024/0270238 A1* | 8/2024 | Min | B60W 30/0956 |
| 2024/0270285 A1* | 8/2024 | Ucar | B60W 30/0956 |

* cited by examiner

*Primary Examiner* — Long T Tran
(74) *Attorney, Agent, or Firm* — NSIP Law

(57) ABSTRACT

A vehicle driving control apparatus including a determination device configured to determine whether a surrounding vehicle driving in a specific area of a host vehicle is equipped with advanced driver assistance systems (ADAS), a setting device configured to adaptively set an ADAS function parameter value of the host vehicle based responsive to determining that the surrounding vehicle is equipped with the ADAS, and a control device configured to control driving of the host vehicle based on the adaptively set ADAS function parameter value.

12 Claims, 9 Drawing Sheets

APPARATUS AND METHOD FOR CONTROLLING VEHICLE DRIVING

CROSS-REFERENCE TO RELATED APPLICATION

This application claims the benefit under 35 USC § 119 (a) of Korean Patent Application No. 10-2023-0085633, filed in the Korean Intellectual Property Office on Jul. 3, 2023, the entire disclosure of which is incorporated herein by reference for all purposes.

BACKGROUND

1. Field

The present disclosure relates to a vehicle driving control apparatus and a method thereof, and more specifically, relates to an apparatus that determines whether a surrounding vehicle is equipped with advanced driver assistance systems (ADAS) and adaptively controls the driving of a host vehicle based on whether the surrounding vehicle is equipped with ADAS, and a method thereof.

2. Description of the Related Art

Nowadays, to prevent accidents caused by a driver's carelessness, ADAS is being variously developed to deliver vehicle driving information to the driver and enable autonomous driving for the driver's convenience.

For example, there is a technology that detects an obstacle around a vehicle and alerts the driver of the detected obstacle with a distance sensor installed in the vehicle. For another example, there is a cruise control technology that allows a vehicle to drive while adjusting a driving speed at a constant rate. Furthermore, there is an adaptive cruise control technology or a smart cruise control technology that controls a distance to another vehicle, stopping, and slowing down as well as automatically controlling driving speed.

For still another example, there is an autonomous driving technology that allows a vehicle to autonomously drive to the destination based on road information and current location information, to detect obstacles, and to autonomously drive to the destination while avoiding the detected obstacles.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In a general aspect, here is provided a vehicle driving control apparatus including a determination device configured to determine whether a surrounding vehicle driving in a specific area of a host vehicle is equipped with advanced driver assistance systems (ADAS), a setting device configured to adaptively set an ADAS function parameter value of the host vehicle based responsive to determining that the surrounding vehicle is equipped with the ADAS, and a control device configured to control driving of the host vehicle based on the adaptively set ADAS function parameter value.

The determination device may be configured to determine a number of radars based on a frequency phase difference and a direction of a radar signal received from the surrounding vehicle, identify a model of the surrounding vehicle through an analysis of an image of the surrounding vehicle captured by a camera of the host vehicle, and determine an ADAS level according to the model of the surrounding vehicle, and the setting device may be configured to adaptively set setting the ADAS function parameter value by reflecting the ADAS level according to the model of the surrounding vehicle.

The setting device may be configured to differently set an inter-vehicle distance of the host vehicle from a front vehicle, responsive to determining that the front vehicle is driving in front of the host vehicle, that a front vehicle lane of the front vehicle is a same lane as a host vehicle lane of the host vehicle, and the front vehicle is equipped with forward collision-avoidance assist (FCA) or smart cruise control (SCC).

The setting device may be configured to differently set a warning time point for a rear vehicle responsive to determining that the rear vehicle is driving behind the host vehicle, that a rear vehicle lane of the rear vehicle is in a same lane as a host vehicle lane of the host vehicle, and that the rear vehicle is equipped with the ADAS, set a first point in time when a distance to the rear vehicle is a first distance, as a first warning time point for the rear vehicle with respect to the rear vehicle equipped with the ADAS, and set a second point in time when the distance to the rear vehicle is a second distance farther than the first distance, as a second warning time for the rear vehicle with respect to the rear vehicle not equipped with the ADAS.

The setting device may be configured to differently set a time point of performing a lane change responsive to determining that a surrounding vehicle lane of the surrounding vehicle is a different lane from a host vehicle lane of the host vehicle, that the surrounding vehicle is equipped with the ADAS, and when the host vehicle performs the lane change while overtaking the surrounding vehicle driving in the different lane.

In a general aspect, here is provided a processor implemented method including determining whether a surrounding vehicle driving in a specific area of a host vehicle is equipped with an ADAS, adaptively setting an ADAS function parameter value of the host vehicle responsive to determining that the surrounding vehicle is equipped with the ADAS, and controlling driving of the host vehicle based on the adaptively set ADAS function parameter value.

The determining may include determining a number of radars based on a frequency phase difference and a direction of a radar signal received from the surrounding vehicle, identifying a model of the surrounding vehicle through an analysis of an image of the surrounding vehicle captured by a camera of the host vehicle, and determining an ADAS level according to the model of the surrounding vehicle, and the setting may include adaptively setting the ADAS function parameter value by reflecting the ADAS level according to the model of the surrounding vehicle.

The setting may include differently setting an inter-vehicle distance of the host vehicle from a front vehicle, responsive to determining that the front vehicle is driving in front of the host vehicle, that a front vehicle lane of the front vehicle is a same lane as a host vehicle lane of the host vehicle, and the front vehicle is equipped with FCA or SCC.

The setting may include differently setting a warning time point for a rear vehicle responsive to determining that the rear vehicle is driving behind the host vehicle, that a rear vehicle lane of the rear vehicle is in a same lane as a host vehicle lane of the host vehicle, and that the rear vehicle is equipped with the ADAS, setting a first point in time when a distance to the rear vehicle is a first distance, as a first warning time point for the rear vehicle with respect to the rear vehicle equipped with the ADAS, and setting a second point in time when the distance to the rear vehicle is a second distance farther than the first distance, as a second warning time for the rear vehicle with respect to the rear vehicle not equipped with the ADAS.

The setting may include differently setting a time point of performing a lane change responsive to determining that a surrounding vehicle lane of the surrounding vehicle is a different lane from a host vehicle lane of the host vehicle, that the surrounding vehicle is equipped with the ADAS, and when the host vehicle performs the lane change while overtaking the surrounding vehicle driving in the different lane.

In a general aspect, here is provided an apparatus including one or more processors configured to execute instructions and a memory storing the instructions, and an execution of the instructions configures the one or more processors to determine whether a surrounding vehicle driving in a specific area of a host vehicle is equipped with advanced driver assistance systems (ADAS), adaptively set an ADAS function parameter value of the host vehicle based responsive to determining that the surrounding vehicle is equipped with the ADAS, and control driving of the host vehicle based on the ADAS function parameter value.

The determining may include determining a number of radars based on a frequency phase difference and a direction of a radar signal received from the surrounding vehicle, identifying a model of the surrounding vehicle through an analysis of an image of the surrounding vehicle captured by a camera of the host vehicle, and determining an ADAS level according to the model of the surrounding vehicle, and the adaptively setting may include adaptively setting the ADAS function parameter value by reflecting the ADAS level according to the model of the surrounding vehicle.

The adaptively setting may include differently setting an inter-vehicle distance of the host vehicle from a front vehicle, responsive to determining that the front vehicle is driving in front of the host vehicle, that a front vehicle lane of the front vehicle is a same lane as a host vehicle lane of the host vehicle, and the front vehicle is equipped with forward collision-avoidance assist (FCA) or smart cruise control (SCC).

The adaptively setting may include differently setting a warning time point for a rear vehicle responsive to determining that the rear vehicle is driving behind the host vehicle, that a rear vehicle lane of the rear vehicle is in a same lane as a host vehicle lane of the host vehicle, and that the rear vehicle is equipped with the ADAS, setting a first point in time when a distance to the rear vehicle is a first distance, as a first warning time point for the rear vehicle with respect to the rear vehicle equipped with the ADAS, and setting a second point in time when the distance to the rear vehicle is a second distance farther than the first distance, as a second warning time for the rear vehicle with respect to the rear vehicle not equipped with the ADAS.

The adaptively setting may include differently setting a time point of performing a lane change responsive to determining that a surrounding vehicle lane of the surrounding vehicle is a different lane from a host vehicle lane of the host vehicle, that the surrounding vehicle is equipped with the ADAS, and when the host vehicle performs the lane change while overtaking the surrounding vehicle driving in the different lane.

Figure 1:
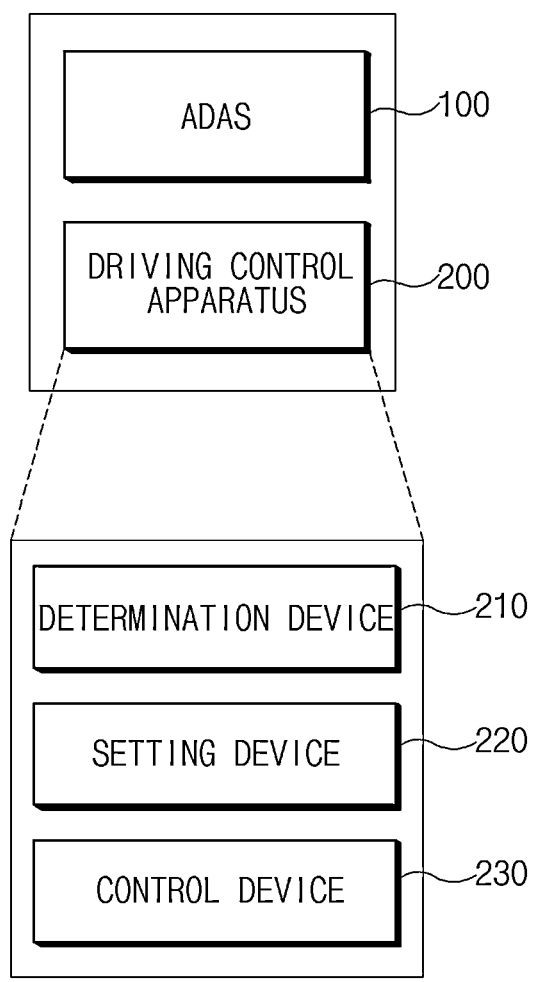
FIG. 1 shows a block diagram of a vehicle driving control apparatus, according to an embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

According to embodiments of the present disclosure, when the driving of a host vehicle equipped with ADAS is controlled, different driving controls may be performed depending on whether the surrounding vehicle is equipped with ADAS, by determining whether ADAS is installed in surrounding vehicles (e.g., a front vehicle, a rear vehicle, and a vehicle driving side by side with a host vehicle) while driving, and adaptively or variably applying a parameter value of each ADAS function of the host vehicle depending on whether ADAS is installed.

According to an embodiment of the present disclosure, the ADAS level or autonomous driving level mounted on each surrounding vehicle may be estimated by determining whether ADAS is installed, through radar signal interference with a surrounding vehicle and identifying a model of the surrounding vehicle through image analysis of the surrounding vehicle captured by a camera of the host vehicle.

FIG. 1 shows a block diagram of a vehicle driving control apparatus, according to an embodiment of the present disclosure, and shows a block diagram of a driving control apparatus mounted on a host vehicle.

As shown in FIG. 1, a vehicle includes ADAS 100 and a driving control apparatus 200.

Although not shown in FIG. 1, the vehicle may include a radar sensor and a camera sensor.

The ADAS 100 refers advanced driver assistance systems, and this part is obvious to those skilled in the art of the present disclosure, and thus detailed descriptions thereof will be omitted to avoid redundancy.

The driving control apparatus 200 may include a determination device 210, a setting device 220, and a control device 230. According to an embodiment, the driving control apparatus 200 may include a vehicle control unit (VCU).

The determination device 210 determines whether a surrounding vehicle driving in a specific area of a host vehicle is equipped with ADAS.

Figure 2A:
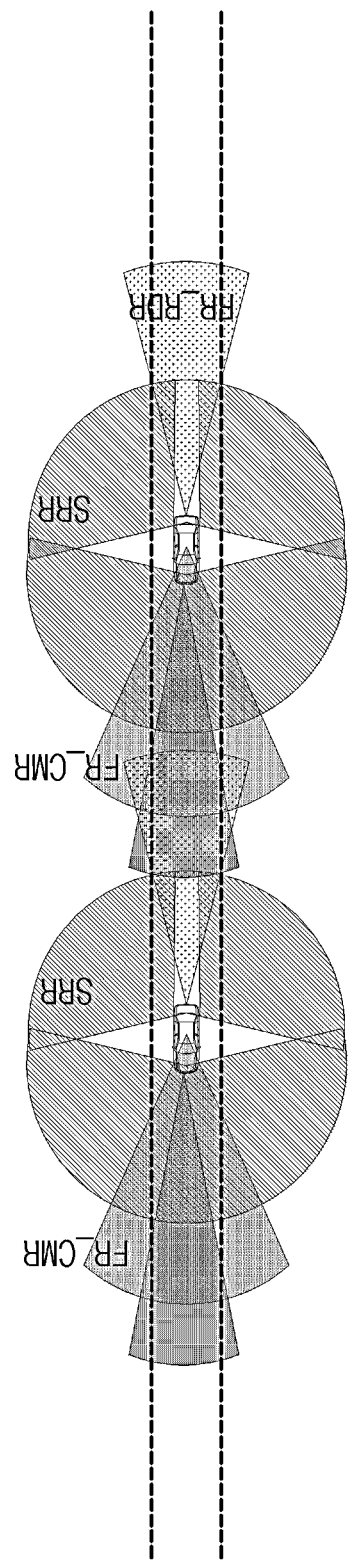
FIGS. 2A and 2B shows an example diagram for describing a method of determining whether a surrounding vehicle is equipped with ADAS.
Figure 2B:
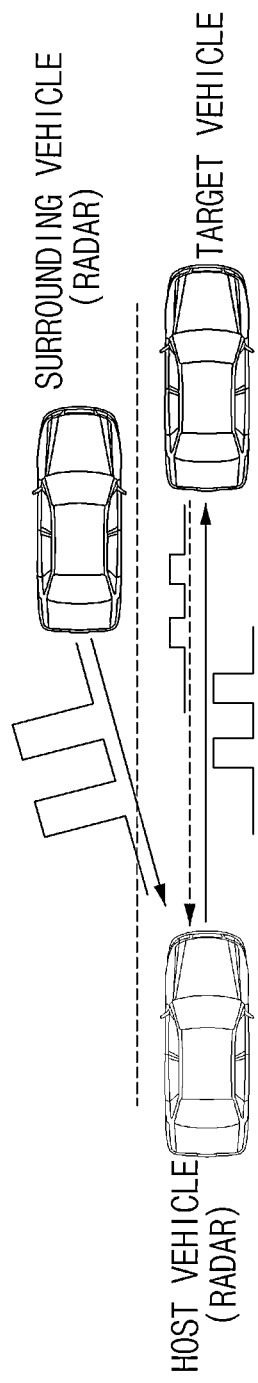

According to an embodiment, as shown in FIG. 2A, the determination device 210 may determine whether a surrounding vehicle is equipped with ADAS through radar signal interference. For example, as shown in FIG. 2B, the determination device 210 may determine whether the surrounding vehicle is equipped with ADAS, based on a frequency difference between a radar signal transmitted from a host vehicle to the surroundings and a radar signal received from the surrounding vehicle, a phase difference at point in time when frequencies are the same as each other, or the like. In this case, the determination device 210 may determine the locations and number (or quantity) of radars mounted on the surrounding vehicle, based on the direction of the radar signal received from the surrounding vehicle, and a frequency phase difference and may determine whether the surrounding vehicle is equipped with ADAS.

According to an embodiment, the determination device 210 may determine whether the surrounding vehicle is equipped with ADAS, may determine the model of the surrounding vehicle through analysis of an image of the surrounding vehicle captured by a camera or camera sensor of the host vehicle, and may determine or estimate an ADAS level or autonomous driving level according to the model of the surrounding vehicle.

In this case, the determination device 210 may determine the model of the surrounding vehicle from the image, which is captured by the camera, by using a deep learning-based artificial intelligence network thus trained in advance and may estimate an ADAS level or autonomous driving level of the identified surrounding vehicle.

The setting device 220 adaptively or variably sets an ADAS function parameter value of the host vehicle based on whether the surrounding vehicle is equipped with ADAS.

According to an embodiment, the setting device 220 may adaptively set the ADAS function parameter value of the host vehicle by reflecting the ADAS level or autonomous driving level according to the model of surrounding vehicle.

According to an embodiment, the setting device 220 may differently set an inter-vehicle distance from a front vehicle based on whether the front vehicle driving in front of the host vehicle on the same lane as the host vehicle is equipped with forward collision-avoidance assist (FCA) or smart cruise control (SCC).

Figure 3:
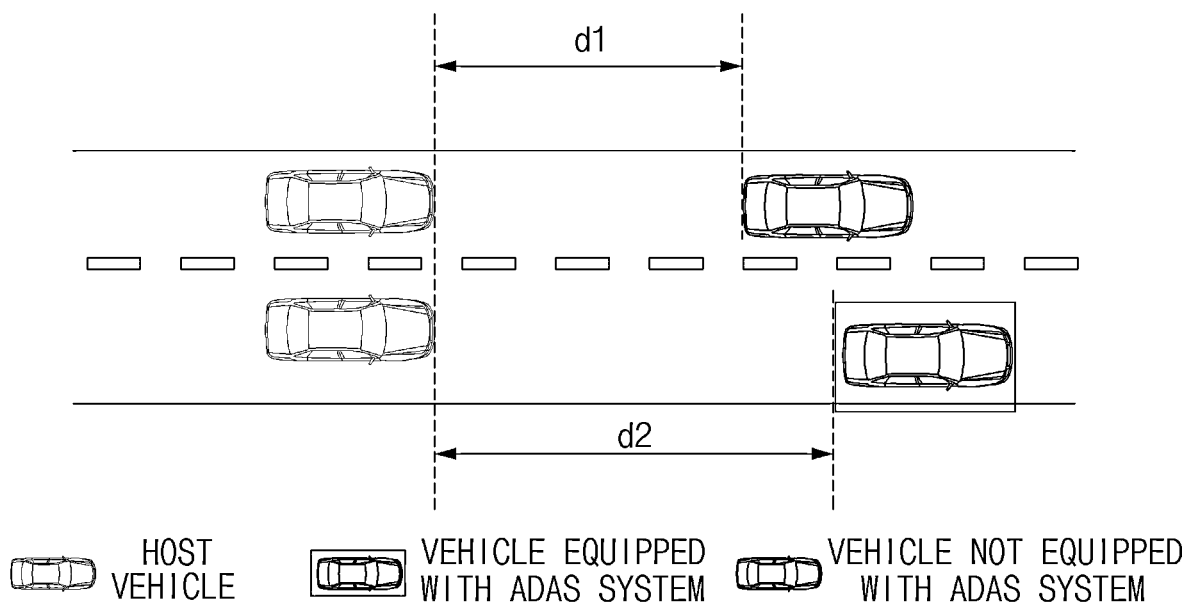
FIG. 3 shows an example diagram for describing optimization of an inter-vehicle distance of a host vehicle based on whether ADAS is installed.

For example, as shown in FIG. 3, when it is determined that the front vehicle driving on the same lane as the host vehicle is not equipped with ADAS, the setting device 220 may set a distance value for optimizing an inter-vehicle distance among the ADAS functions of the host vehicle as a first distance value d1. When it is determined that the front vehicle driving on the same lane as the host vehicle is equipped with ADAS, the setting device 220 may set a distance value for optimizing an inter-vehicle distance among the ADAS functions of the host vehicle to a second distance value d2. Here, because emergency braking may occur in the front vehicle due to FCA mounted on the front vehicle, the second distance value d2 greater than the first distance value d1 is set when ADAS is installed on the front vehicle in the setting device 220. Accordingly, the setting device 220 may adaptively set the ADAS parameter value capable of optimizing the inter-vehicle distance based on whether ADAS is installed on the front vehicle driving on the same driving lane.

According to an embodiment, the setting device 220 may differently set a warning time point for the rear vehicle based on whether the rear vehicle driving behind the host vehicle on the same lane as the host vehicle is equipped with ADAS. The setting device 220 may set a point in time when a distance to the rear vehicle is a third distance, as a warning time point for the rear vehicle with respect to the rear vehicle equipped with ADAS. The setting device 220 may set a point in time when the distance to the rear vehicle is a fourth distance farther than the third distance, as a warning time for the rear vehicle with respect to the rear vehicle not equipped with ADAS.

Figure 4:
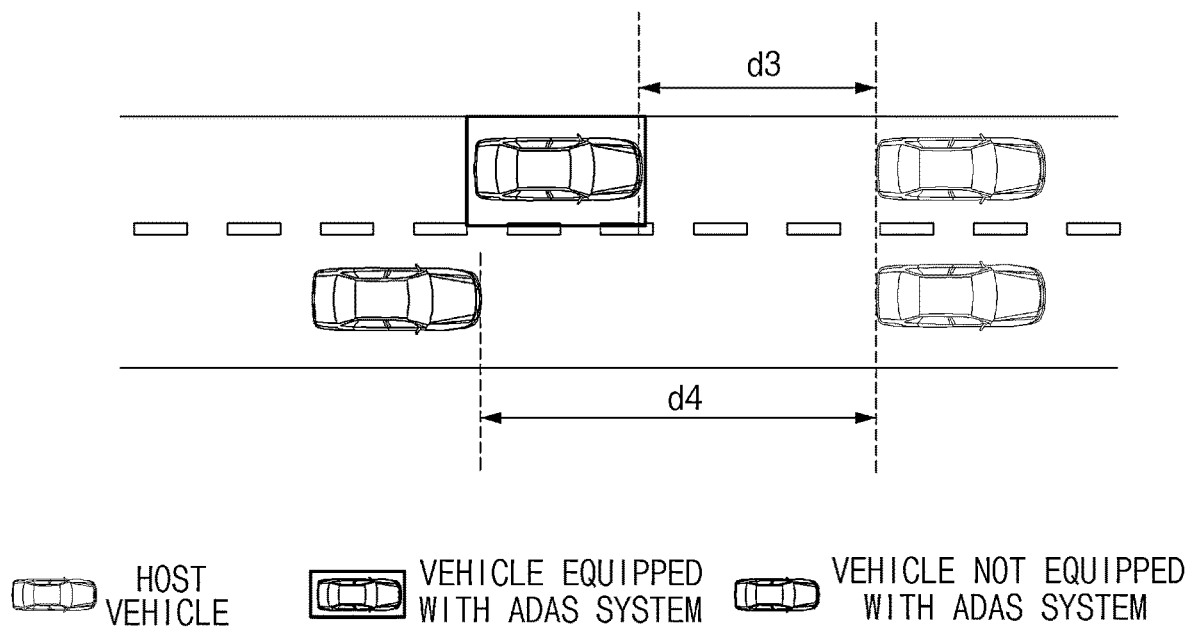
FIG. 4 shows an example diagram for describing a rear vehicle warning time point of a host vehicle based on whether ADAS is installed.

For example, as shown in FIG. 4, when it is determined that the rear vehicle driving behind the host vehicle on the same lane as the host vehicle is equipped with ADAS, the setting device 220 may set the parameter value for rear vehicle warning and control stability area optimization among the ADAS functions of the host vehicle as the third distance value d3, and then may generate a warning for the rear vehicle when the rear vehicle is within the third distance value d3. Moreover, when it is determined that the rear vehicle driving behind the host vehicle on the same lane as the host vehicle is not equipped with ADAS, the setting device 220 may set the parameter value for rear vehicle warning and control stability area optimization among the ADAS functions of the host vehicle as a fourth distance value d4 greater than the third distance value d3, and then may generate a warning for the rear vehicle when the rear vehicle is within the fourth distance value d4. Here, because the rear vehicle optimizes a distance between the rear vehicle and the front vehicle when the rear vehicle is equipped with ADAS, but a driver in the rear vehicle needs to directly maintain an inter-vehicle distance when the rear vehicle is not equipped with ADAS, the setting device 220 may set the parameter value for rear vehicle as the fourth distance value d4 greater than the third distance value d3 when the rear vehicle is not equipped with ADAS. Accordingly, accidents with the host vehicle may be prevented from occurring due to the mistake of the driver of the rear vehicle. Accordingly, the setting device 220 may adaptively set an ADAS parameter value for the rear vehicle warning time point and the control safety area optimization based on whether ADAS is installed on the rear vehicle driving on the same driving lane.

According to an embodiment, when the host vehicle performs a lane change by overtaking a surrounding vehicle driving on a driving lane different from the driving lane of the host vehicle, the setting device 220 may differently set the time point of performing a lane change based on whether the surrounding vehicle on the different driving lane is equipped with ADAS.

In this case, the setting device 220 may differently set a point in time when a lane is changed according to a case of performing short-range lane change and a case of setting an autonomous driving route, and the ADAS function parameter value for selecting changeable lanes, based on whether the surrounding vehicle is equipped with ADAS. This will be described with reference to FIGS. 5 and 6.

Figure 5:
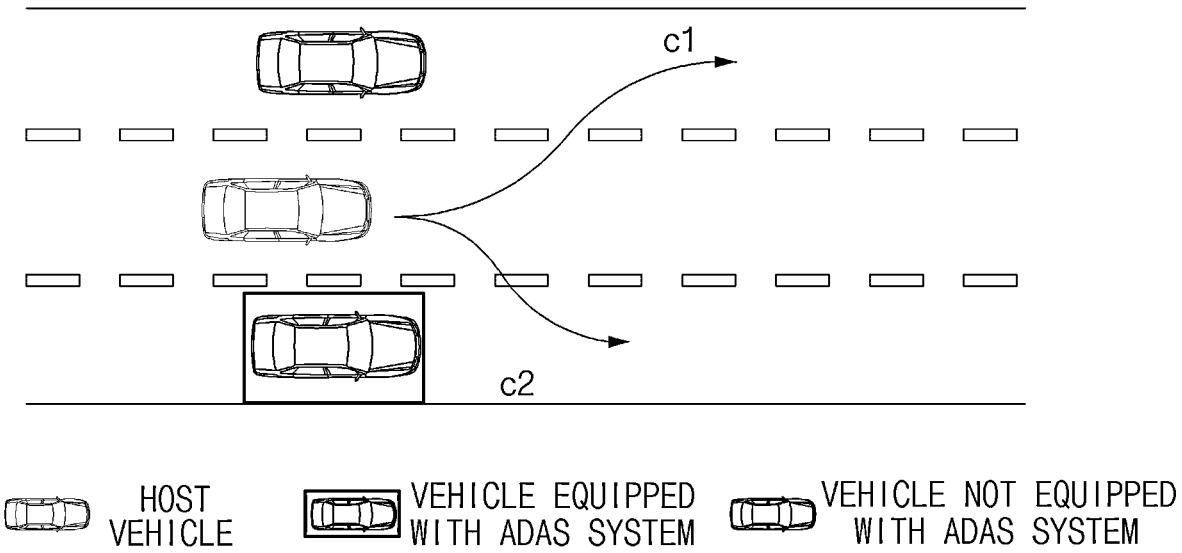
FIG. 5 shows an example diagram for describing a short-range lane change of a host vehicle based on whether ADAS is installed.

FIG. 5 shows an example diagram for describing a short-range lane change of a host vehicle based on whether ADAS is installed. As shown in FIG. 5, when a host vehicle performs a lane change while overtaking a surrounding vehicle equipped with ADAS driving on a driving lane different from the driving lane of the host vehicle, the setting device 220 may be set (c2) a ADAS function parameter value for a short-range lane change so as to perform a lane change to a driving lane of the surrounding vehicle at the fifth distance value, which is a distance at which the corresponding surrounding vehicle (a vehicle equipped with ADAS) is close to the host vehicle. When a host vehicle performs a lane change while overtaking a surrounding vehicle not equipped with ADAS driving on a driving lane different from the driving lane of the host vehicle, the setting device 220 may be set (c1) a ADAS function parameter value for a short-range lane change so as to perform a lane change to a driving lane of the surrounding vehicle at a sixth distance value where a distance from the corresponding surrounding vehicle (a vehicle not equipped with ADAS) is set to be farther than the fifth distance value. Accordingly, when a host vehicle performs a lane change while overtaking a surrounding vehicle driving on a driving lane different from the driving lane of the host vehicle, the setting device 220 may adaptively set an ADAS parameter value for a short-range lane change based on whether the surrounding vehicle driving on a lane to be changed is equipped with ADAS.

Figure 6:
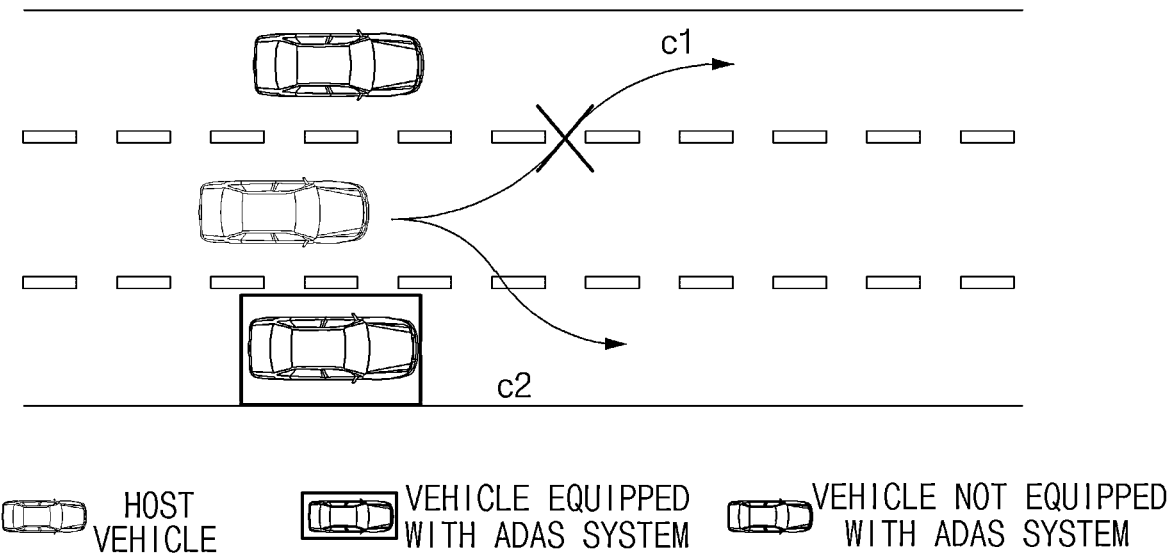
FIG. 6 shows an example diagram for describing setting of an autonomous driving route of a host vehicle based on whether ADAS is installed.

FIG. 6 shows an example diagram for describing setting of an autonomous driving route of a host vehicle based on whether ADAS is installed. As illustrated in FIG. 6, when a host vehicle performs a lane change while overtaking a surrounding vehicle driving on a driving lane different from the driving lane of the host vehicle when the setting device 220 sets an autonomous driving route, the setting device 220 may set the ADAS function parameter value for autonomous driving route so as to perform a lane change (c2) to a lane on which a surrounding vehicle equipped with ADAS is driving without performing a lane changing (c1) to a lane on which a surrounding vehicle not equipped with ADAS is driving. That is, when the host vehicle performs a lane change while driving autonomously, the setting device 220 prevents a lane change (c1) to the driving lane of a surrounding vehicle not equipped with ADAS from being performed, thereby preventing accidents between a vehicle not equipped with ADAS and the host vehicle in advance.

In contrast, the setting device 220 is not limited to the functions of the ADAS described above, and may adaptively set parameter values for all functions capable of being performed in ADAS based on whether the surrounding vehicle is equipped with ADAS.

The control device 230 controls the driving of the host vehicle based on the ADAS function parameter value adaptively set by the setting device 220.

According to an embodiment, the control device 230 may control vehicle driving for optimizing an inter-vehicle distance to the front vehicle based on a parameter value for minimizing the inter-vehicle distance adaptively set depending on whether ADAS is installed.

According to an embodiment, the control device 230 may control vehicle driving for optimizing a distance from the rear vehicle and a control safety area based on a parameter value for a rear vehicle warning adaptively set depending on whether ADAS is installed.

According to an embodiment, the control device 230 may control vehicle driving for a short-range lane change that overtakes a surrounding vehicle, based on a parameter value for a short-range lane change adaptively set depending on whether ADAS is installed.

According to an embodiment, the control device 230 may determine a surrounding vehicle to be overtaken and a lane to be changed, based on a parameter value for settings an autonomous driving route adaptively set depending on whether ADAS is installed, and may control vehicle driving for a lane change to the corresponding lane after overtaking the surrounding vehicle equipped with ADAS.

As such, the vehicle driving control method according to embodiments of the present disclosure may determine whether the surrounding vehicle is equipped with ADAS, and may adaptively control the driving of the host vehicle depending on whether the surrounding vehicle is equipped with ADAS.

Preferably, the vehicle driving control method according to embodiments of the present disclosure may control the driving of a vehicle by adaptively applying an ADAS function parameter value of the host vehicle, in consideration of whether the surrounding vehicle is equipped with ADAS. For example, according to an embodiment of the present disclosure, different driving controls may be performed based on whether the surrounding vehicle is equipped with ADAS, and an ADAS function being performed on a host vehicle by using adaptive parameter values depending on ADAS functions such as creation of a driving route, selection of a driving lane, adjustment of a distance between a front and rear vehicle gap, selection of a lane to be changed, and decrease/increase in emergency braking force, and the like in consideration of whether the surrounding vehicle is equipped with ADAS.

Moreover, the vehicle driving control method according to embodiments of the present disclosure may adaptively control a lane to be changed and a time point of a lane change based on whether a vehicle driving on another lane is equipped with ADAS when a lane is changed in the ADAS (e.g., a lane change assistant system), thereby performing safe driving when a host vehicle is autonomously driving.

That is, the vehicle driving control method according to an embodiment of the present disclosure may perform driving control of the host vehicle in consideration of the installation of ADAS on the surrounding vehicle, which may serve as a factor in increasing the driving convenience and safety of the host vehicle.

Figure 7:
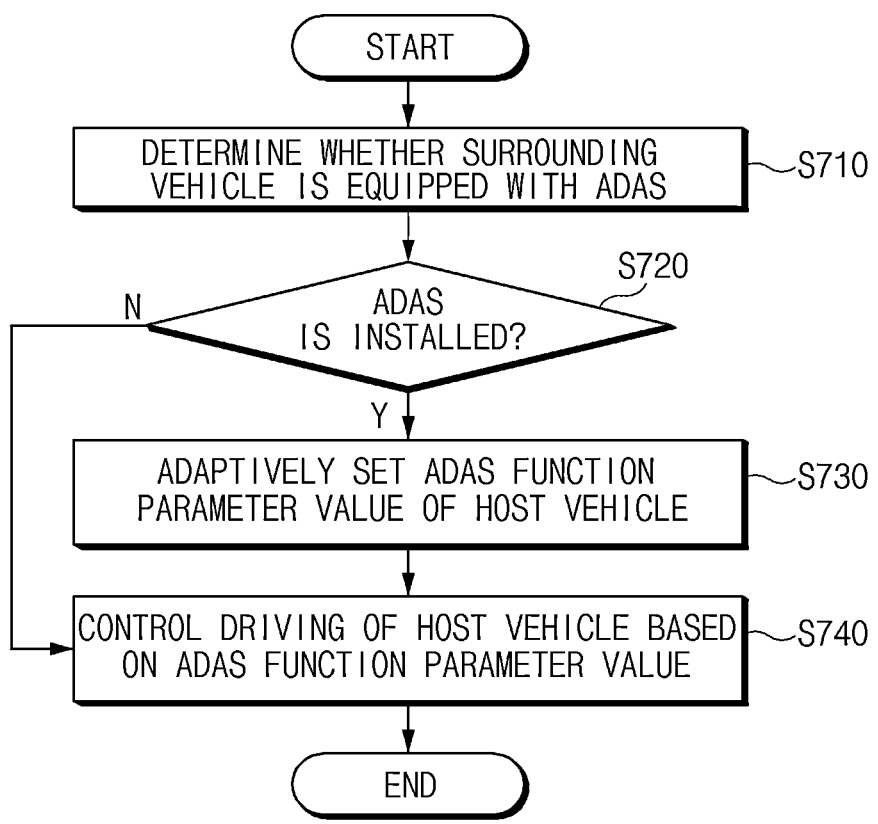
FIG. 7 shows an operation flowchart for a vehicle driving control method, according to another embodiment of the present disclosure.

FIG. 7 shows an operation flowchart for a vehicle driving control method, according to another embodiment of the present disclosure, and shows a flowchart of operations performed by the driving control apparatus shown in FIG. 1.

Referring to FIG. 7, a vehicle driving control method according to another embodiment of the present disclosure determines whether a surrounding vehicle driving in a specific area of a host vehicle is equipped with ADAS, and adaptively sets an ADAS function parameter value of the host vehicle based on whether the surrounding vehicle is equipped with ADAS (S710, S720, and S730).

According to an embodiment, S710 may include determining the number of radars based on a frequency phase difference and a direction of a radar signal received from the surrounding vehicle, identifying a model of the surrounding vehicle through analysis of an image of the surrounding vehicle captured by a camera of the host vehicle, and determining an ADAS level or an autonomous driving level according to the model of the surrounding vehicle.

According to an embodiment, S730 may include adaptively setting the ADAS function parameter value of the host vehicle by reflecting the ADAS level according to the model of surrounding vehicle.

According to an embodiment, S730 may include differently setting an inter-vehicle distance from a front vehicle based on whether the front vehicle driving in front of the host vehicle on the same lane as the host vehicle is equipped with forward collision-avoidance assist (FCA) or smart cruise control (SCC).

According to an embodiment, S730 may include differently setting a warning time point for the rear vehicle based on whether the rear vehicle driving behind the host vehicle on the same lane as the host vehicle is equipped with ADAS, setting a point in time when a distance to the rear vehicle is a first distance, as a warning time point for the rear vehicle with respect to the rear vehicle equipped with ADAS, and setting a point in time when the distance to the rear vehicle is a second distance farther than the first distance, as a warning time for the rear vehicle with respect to the rear vehicle not equipped with ADAS.

According to an embodiment, S730 may include differently setting a lane to be changed, and a time point of performing a lane change based on whether the surrounding vehicle on the different driving lane is equipped with ADAS when the host vehicle performs a lane change by overtaking a surrounding vehicle driving on a driving lane different from the driving lane of the host vehicle.

When the ADAS function parameter value is adaptively set depending on whether the surrounding vehicle is equipped with ADAS in S720 and S730, the driving of the host vehicle is controlled based on the adaptively set ADAS function parameter value (S740).

Even though the description is omitted in the method according to another embodiment of the present disclosure, it will be apparent to those skilled in the art that the method according to another embodiment of the present disclosure may include all of the contents described in the apparatus of FIGS. 1 to 6, and this will be obvious to those skilled in the art.

Figure 8:
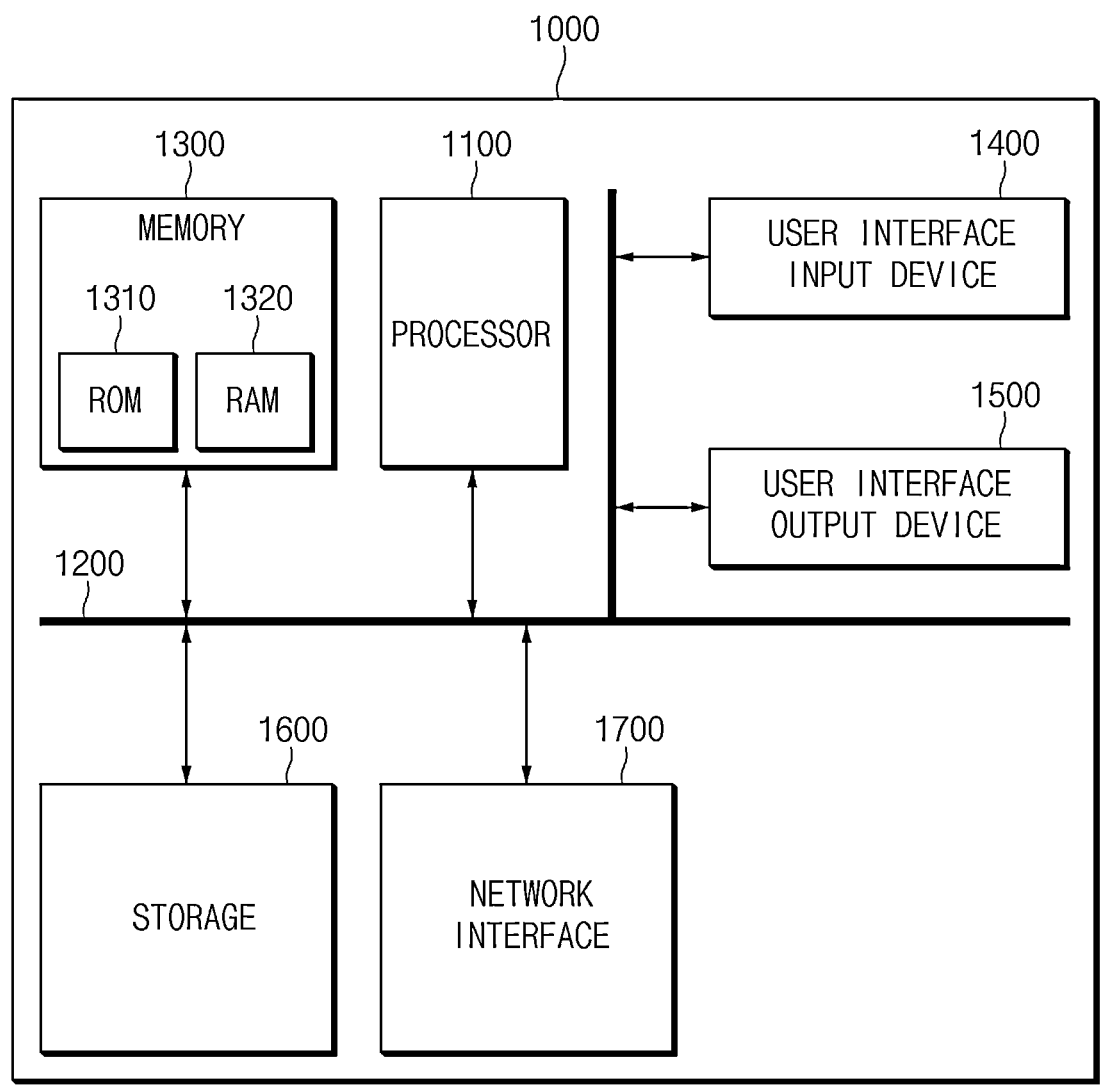
FIG. 8 shows a block diagram of a computing system for executing a vehicle driving control method, according to another embodiment of the present disclosure.

FIG. 8 shows a block diagram of a computing system for executing a vehicle driving control method, according to another embodiment of the present disclosure.

Referring to FIG. 8, a vehicle driving control method according to another embodiment of the present disclosure described above may also be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor 1100 and storage medium may be implemented with an application specific integrated circuit (ASIC). The ASIC may be provided in a user terminal. Alternatively, the processor 1100 and storage medium may be implemented with separate components in the user terminal.

According to an embodiment of the present disclosure, it is possible to provide an apparatus that may determine whether a surrounding vehicle is equipped with ADAS and adaptively controls the driving of a host vehicle based on whether the surrounding vehicle is equipped with ADAS, and a method thereof.

According to an embodiment of the present disclosure, it is possible to provide an apparatus that may control the driving of a vehicle by adaptively applying an ADAS function parameter value of the host vehicle, in consideration of whether the surrounding vehicle is equipped with ADAS. For example, according to an embodiment of the present disclosure, different driving controls may be performed based on whether the surrounding vehicle is equipped with ADAS, and an ADAS function being performed on a host vehicle by using adaptive parameter values depending on ADAS functions such as creation of a driving route, selection of a driving lane, adjustment of a distance between a front and rear vehicle gap, selection of a lane to be changed, and decrease/increase in emergency braking force, and the like in consideration of whether the surrounding vehicle is equipped with ADAS.

According to an embodiment of the present disclosure, safe driving may be made when a host vehicle is autonomously driving, by adaptively controlling a lane to be changed and a time point of a lane change based on whether a vehicle driving on another lane is equipped with ADAS when a lane is changed in ADAS (e.g., a lane change assistant system).

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle driving control apparatus, comprising:
    a determination device configured to determine whether a surrounding vehicle driving in a specific area of a host vehicle is equipped with advanced driver assistance systems (ADAS), wherein the determination device is configured to: (i) determine a number of radars based on a frequency phase difference and a direction of a radar signal received from the surrounding vehicle; and (ii) identify a model of the surrounding vehicle through an analysis of an image of the surrounding vehicle captured by a camera of the host vehicle, and determine an ADAS level according to the model of the surrounding vehicle;
    a setting device configured to adaptively set an ADAS function parameter value of the host vehicle based responsive to determining that the surrounding vehicle is equipped with the ADAS; and
    a control device configured to control driving of the host vehicle based on the adaptively set ADAS function parameter value.

2. The vehicle driving control apparatus of claim 1, wherein the setting device is configured to:
    differently set an inter-vehicle distance of the host vehicle from a front vehicle, responsive to determining that the front vehicle is driving in front of the host vehicle, that a front vehicle lane of the front vehicle is a same lane as a host vehicle lane of the host vehicle, and the front vehicle is equipped with forward collision-avoidance assist (FCA) or smart cruise control (SCC).

3. The vehicle driving control apparatus of claim 1, wherein the setting device is configured to:
differently set a warning time point for a rear vehicle responsive to determining that the rear vehicle is driving behind the host vehicle, that a rear vehicle lane of the rear vehicle is in a same lane as a host vehicle lane of the host vehicle, and that the rear vehicle is equipped with the ADAS;
set a first point in time when a distance to the rear vehicle is a first distance, as a first warning time point for the rear vehicle with respect to the rear vehicle equipped with the ADAS; and
set a second point in time when the distance to the rear vehicle is a second distance farther than the first distance, as a second warning time for the rear vehicle with respect to the rear vehicle not equipped with the ADAS.

4. The vehicle driving control apparatus of claim 1, wherein the setting device is configured to:
differently set a time point of performing a lane change responsive to determining that a surrounding vehicle lane of the surrounding vehicle is a different lane from a host vehicle lane of the host vehicle, that the surrounding vehicle is equipped with the ADAS, and when the host vehicle performs the lane change while overtaking the surrounding vehicle driving in the different lane.

5. A processor implemented method, the method comprising:
determining whether a surrounding vehicle driving in a specific area of a host vehicle is equipped with an ADAS, wherein the determining comprises: (i) determining a number of radars based on a frequency phase difference and a direction of a radar signal received from the surrounding vehicle; and (ii) identifying a model of the surrounding vehicle through an analysis of an image of the surrounding vehicle captured by a camera of the host vehicle, and determining an ADAS level according to the model of the surrounding vehicle;
adaptively setting an ADAS function parameter value of the host vehicle responsive to determining that the surrounding vehicle is equipped with the ADAS; and
controlling driving of the host vehicle based on the adaptively set ADAS function parameter value.

6. The method of claim 5, wherein the setting comprises:
differently setting an inter-vehicle distance of the host vehicle from a front vehicle, responsive to determining that the front vehicle is driving in front of the host vehicle, that a front vehicle lane of the front vehicle is a same lane as a host vehicle lane of the host vehicle, and the front vehicle is equipped with FCA or SCC.

7. The method of claim 5, wherein the setting comprises:
differently setting a warning time point for a rear vehicle responsive to determining that the rear vehicle is driving behind the host vehicle, that a rear vehicle lane of the rear vehicle is in a same lane as a host vehicle lane of the host vehicle, and that the rear vehicle is equipped with the ADAS;
setting a first point in time when a distance to the rear vehicle is a first distance, as a first warning time point for the rear vehicle with respect to the rear vehicle equipped with the ADAS; and
setting a second point in time when the distance to the rear vehicle is a second distance farther than the first distance, as a second warning time for the rear vehicle with respect to the rear vehicle not equipped with the ADAS.

8. The method of claim 5, wherein the setting comprises:
differently setting a time point of performing a lane change responsive to determining that a surrounding vehicle lane of the surrounding vehicle is a different lane from a host vehicle lane of the host vehicle, that the surrounding vehicle is equipped with the ADAS, and when the host vehicle performs the lane change while overtaking the surrounding vehicle driving in the different lane.

9. An apparatus, comprising:
one or more processors configured to execute instructions; and
a memory storing the instructions,
wherein execution of the instructions configures the one or more processors to:
determine whether a surrounding vehicle driving in a specific area of a host vehicle is equipped with advanced driver assistance systems (ADAS), wherein the determining comprises: (i) determining a number of radars based on a frequency phase difference and a direction of a radar signal received from the surrounding vehicle; and (ii) identifying a model of the surrounding vehicle through an analysis of an image of the surrounding vehicle captured by a camera of the host vehicle, and determining an ADAS level according to the model of the surrounding vehicle;
adaptively set an ADAS function parameter value of the host vehicle based responsive to determining that the surrounding vehicle is equipped with the ADAS; and
control driving of the host vehicle based on the ADAS function parameter value.

10. The apparatus of claim 9, wherein the adaptively setting comprises:
differently setting an inter-vehicle distance of the host vehicle from a front vehicle, responsive to determining that the front vehicle is driving in front of the host vehicle, that a front vehicle lane of the front vehicle is a same lane as a host vehicle lane of the host vehicle, and the front vehicle is equipped with forward collision-avoidance assist (FCA) or smart cruise control (SCC).

11. The apparatus of claim 9, wherein the adaptively setting comprises:
differently setting a warning time point for a rear vehicle responsive to determining that the rear vehicle is driving behind the host vehicle, that a rear vehicle lane of the rear vehicle is in a same lane as a host vehicle lane of the host vehicle, and that the rear vehicle is equipped with the ADAS;
setting a first point in time when a distance to the rear vehicle is a first distance, as a first warning time point for the rear vehicle with respect to the rear vehicle equipped with the ADAS; and
setting a second point in time when the distance to the rear vehicle is a second distance farther than the first distance, as a second warning time for the rear vehicle with respect to the rear vehicle not equipped with the ADAS.

12. The apparatus of claim 9, wherein the adaptively setting comprises:
differently setting a time point of performing a lane change responsive to determining that a surrounding vehicle lane of the surrounding vehicle is a different lane from a host vehicle lane of the host vehicle, that the surrounding vehicle is equipped with the ADAS, and when the host vehicle performs the lane change while overtaking the surrounding vehicle driving in the different lane.

* * * * *